United States Patent [19]

Nitschke et al.

[11] Patent Number: 5,357,141
[45] Date of Patent: Oct. 18, 1994

[54] ELECTRONIC DEVICE

[75] Inventors: Werner Nitschke, Ditzingen; Reinhard Pfeufer, Möglingen; Wolfgang Drobny, Besigheim; Peter Taufer, Renningen, all of Fed. Rep. of Germany

[73] Assignee: Robert Bosch GmbH, Stuttgart, Fed. Rep. of Germany

[21] Appl. No.: 5,852

[22] Filed: Jan. 13, 1993

Related U.S. Application Data

[63] Continuation of Ser. No. 585,109, Nov. 21, 1990, abandoned.

[30] Foreign Application Priority Data

Apr. 2, 1988 [DE] Fed. Rep. of Germany ....... 3811217

[51] Int. Cl.$^5$ ............................................. B60R 21/02
[52] U.S. Cl. .................................. 307/10.1; 280/735; 340/825.62
[58] Field of Search ................... 307/9.1, 10.1; 340/436–438, 669, 825.34, 825.07, 825.08, 825.57, 825,62; 180/274, 281, 282, 286; 280/735; 364/424.05

[56] References Cited

U.S. PATENT DOCUMENTS

| 4,087,782 | 5/1978 | Oishi et al. . | |
| 4,178,016 | 12/1979 | Andres et al. . | |
| 4,328,586 | 5/1982 | Hansen | 340/825.62 X |
| 4,359,715 | 11/1982 | Langer et al. | 307/10.1 X |
| 4,381,829 | 5/1983 | Montaron | 180/274 |
| 4,497,025 | 1/1985 | Hannoyer | 280/735 X |
| 4,538,262 | 8/1985 | Sinniger et al. | 307/10.1 X |
| 4,578,591 | 3/1986 | Floyd et al. | 340/825.57 X |
| 4,594,571 | 6/1986 | Neuhaus et al. | 307/10.1 X |
| 4,677,308 | 6/1987 | Wroblewski et al. | 307/10.1 |
| 4,760,275 | 7/1988 | Sato et al. | 307/10.1 |
| 4,853,932 | 8/1989 | Nitschke et al. | 371/68 |
| 4,873,451 | 10/1989 | Pristerá et al. | 307/10.1 |
| 4,950,914 | 8/1990 | Kurihara et al. | 307/10.1 |

FOREIGN PATENT DOCUMENTS 2271956 12/1975 France .
2366030 4/1978 France .

Primary Examiner—A. D. Pellinen
Assistant Examiner—Fritz M. Fleming
Attorney, Agent, or Firm—Kenyon & Kenyon

[57] ABSTRACT

An apparatus for controlling motor vehicle safety devices has a plurality of sensors, each coupled to a control unit. The control unit in turn activates inertial restraining devices based on the output signals generated by the sensors.

22 Claims, 7 Drawing Sheets

S 1  0 1 0 1 0 1 0 1

S 2  0 1 1 0 0 1 1 0

S 3  0 1 0 1 1 0 1 0

S 4  0 1 0 1 0 0 1 0

ELECTRONIC DEVICE

This is a continuation of application Ser. No. 07/585,109 filed on Nov. 21, 1990, abandoned.

FIELD OF THE INVENTION

The present invention relates to control apparatus for motor vehicles and, in particular, to methods and apparatus for controlling motor vehicle safety devices.

BACKGROUND INFORMATION

A typical control system for controlling motor vehicle safety devices is shown in DE-A-2 151 399, and includes two sensors, which are piezoelectric crystals. When mechanically stressed by the acceleration of the vehicle, the sensors generate an electrical output voltage. The output voltage is supplied through a stranded cable and processed by a control unit.

One disadvantage of this system is that because it uses only a few sensors, its operability is jeopardized should one of the sensors become inoperative. Furthermore, the attempted solution of an arbitrary number of sensors has not solved the problem, since the reliability of the safety device is not increased. An increased number of sensors merely increases the complexity of the wiring and connecting means. As viewed over the life of the vehicle, this introduces numerous sources of error.

Another safety control system for motor vehicles is shown in U.S. Pat. No. 4,381,829, which uses several acceleration detectors distributed in various locations on the vehicle. All of the acceleration sensors are connected through a multiplexer to an analog to digital converter. The analog to digital converter converts output signals of the analog sensor into digital signals. The digital signals are then supplied to a microprocessor. One disadvantage of this system is that only the output signals of each respective sensor, which are selected by the multiplexer, are available for evaluation at a given time.

It is an object of the present invention, therefore, to overcome the problems and disadvantages of known control systems for controlling motor vehicle safety devices.

SUMMARY OF THE INVENTION

The method and apparatus of the present invention has the significant advantage of increased overall system reliability. The simplified routing of cable between the sensors and the corresponding control unit also has the advantage of permitting new safety device operating modes. For example, with the apparatus of the present invention it is possible to guarantee the safety of the vehicle occupants even when one or more sensors are inoperable. In such a case, a reevaluation of the output signals from the remaining operable sensors is conducted and the system is controlled based on these signals.

Other advantages of the apparatus and method of the present invention will become apparent in view of the following detailed description and drawings taken in connection therewith.

DETAILED DESCRIPTION

Figure 1:
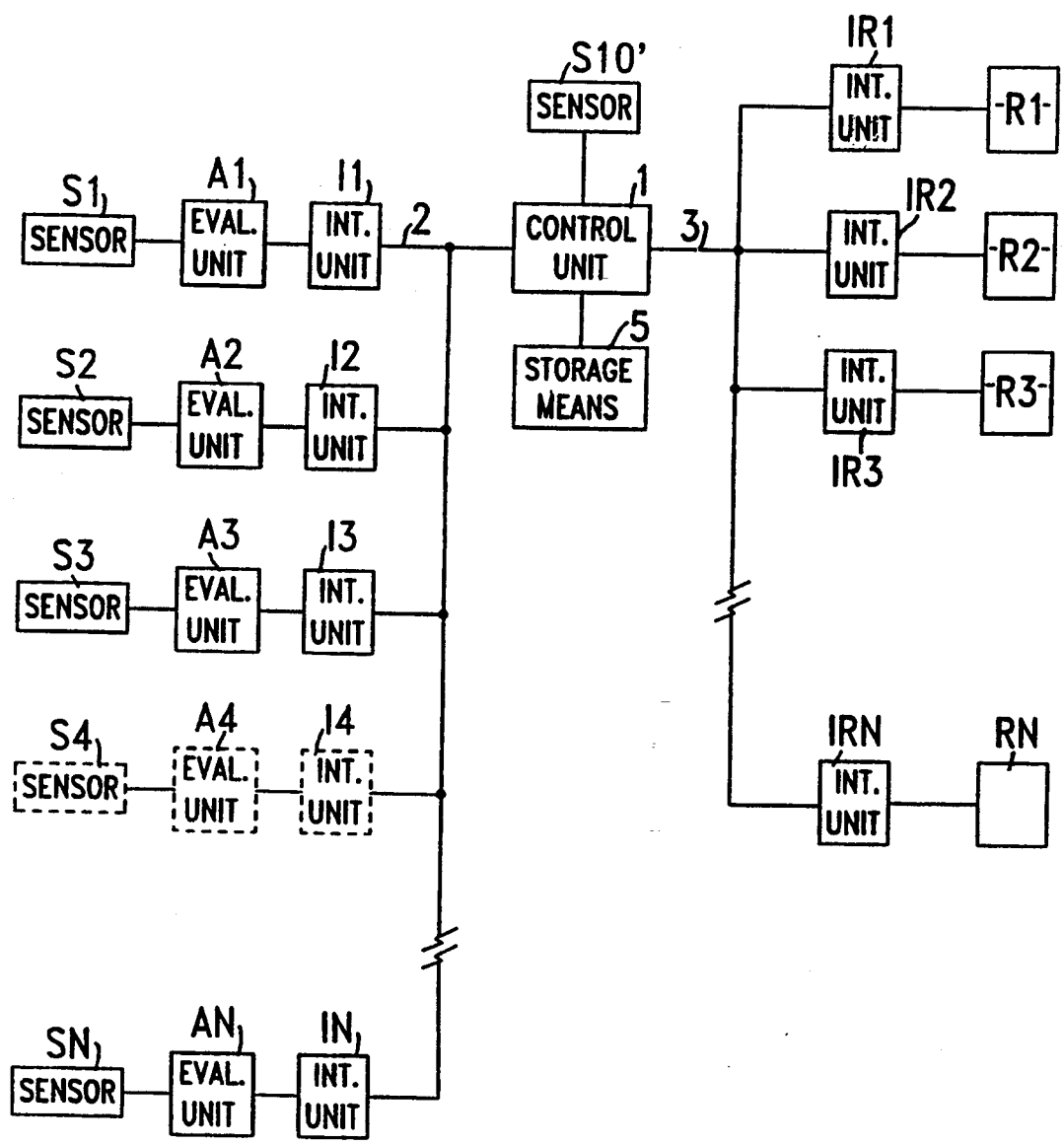
FIG. 1 is a schematic diagram of an apparatus embodying the present invention.

In FIG. 1, an apparatus embodying the present invention for controlling motor vehicle safety devices is illustrated. The apparatus includes a central control unit 1, which is coupled through a first line 2 to a plurality of sensors S1, S2 ... SN, which are each mounted in various locations within a vehicle (not shown). The first line 2 is preferably a serial data transmission line and, in particular, a star connected single core data transmission line.

The apparatus further comprises an evaluation circuit, which includes a plurality of evaluating units A1, A2 ... AN. The evaluating units are coupled to the corresponding sensors S1, S2 ... SN and, in turn, to the first line 2 through corresponding interface units I1, I2 ... IN. The apparatus further includes inertial restraining devices R1, R2 ... RN, which are coupled to the control unit 1 by a second line 3 and through corresponding interface units IR1, IR2 ... IRN. The inertial restraining devices R1, R2 ... RN are airbags and belt tighteners for protecting the passengers during vehicle collisions or potential accident situations, by preventing injuries caused by impact with hard vehicle parts.

The sensors S1, S2 ... SN preferably include piezoelectric crystals which emit an output in the form of voltage signals when placed under compressive stress. The evaluating units A1, A2 ... AN are coupled to the corresponding sensors S1, S2 ... SN and to the control unit 1 through the corresponding interface units I1, I2 ... IN and the first line 2. The evaluating units A1, A2 ... AN process the output signals generated by the sensors S1, S2 ... SN at the respective mounting locations of the sensors. The output signals are transmitted to the control unit 1 over the first line 2 through the corresponding interface units I1, I2 ... IN.

The control unit 1 is coupled to a storage means 5, the first line 2, the second line 3 and a sensor S10'. The storage means 5 is used for storing data corresponding to the number of existing sensors S1, S2 ... SN, the type of sensors, the respective mounting location of the sensors, and, if desired, a rating operation. The rating operation is used to evaluate the output signals generated by any one of the sensors S1, S2 ... SN. The rating operation data is typically permanent data specified by the vehicle manufacturer. However, other advantageous features of the present invention permit the rating data to be entered later or altered by appropriately designed programmable storage means. This is important when retrofitting a motor vehicle with new types of sensors or when making modifications which affect the safety features thereof.

Each sensor unit, which comprises respectively one sensor S1, S2 ... SN, one assigned evaluating unit A1, A2 ... AN, and one assigned interface unit I1, I2 ... IN, has the ability to exchange data with the central control unit 1 over the first line 2. Thus, each sensor unit can receive data from, or transfer data to, the control unit 1.

Figure 2:
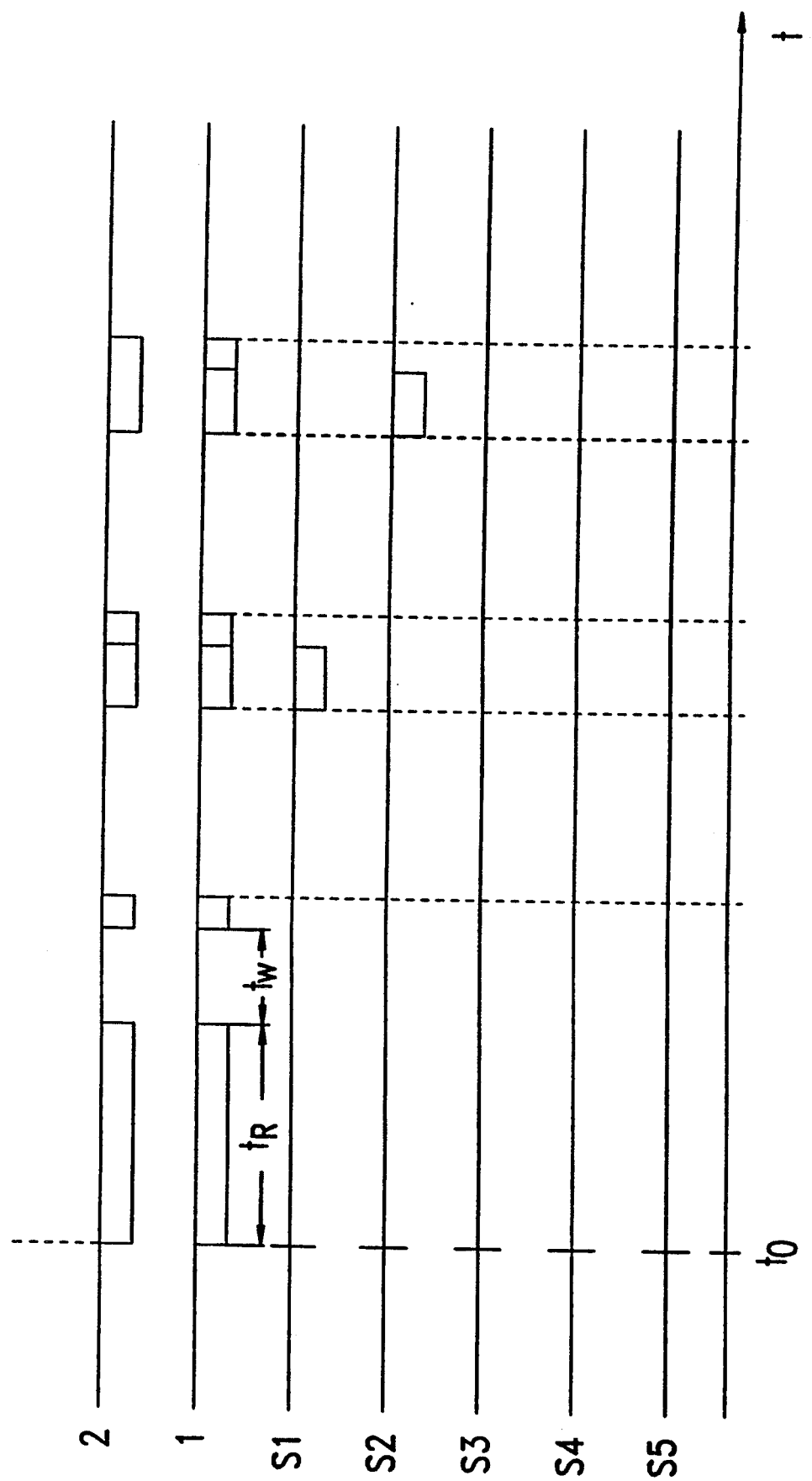
FIG. 2 a pulse diagram illustrating the pulses of the apparatus of FIG. 1 as a function of time during a start-up phase of the apparatus.
Figure 3:
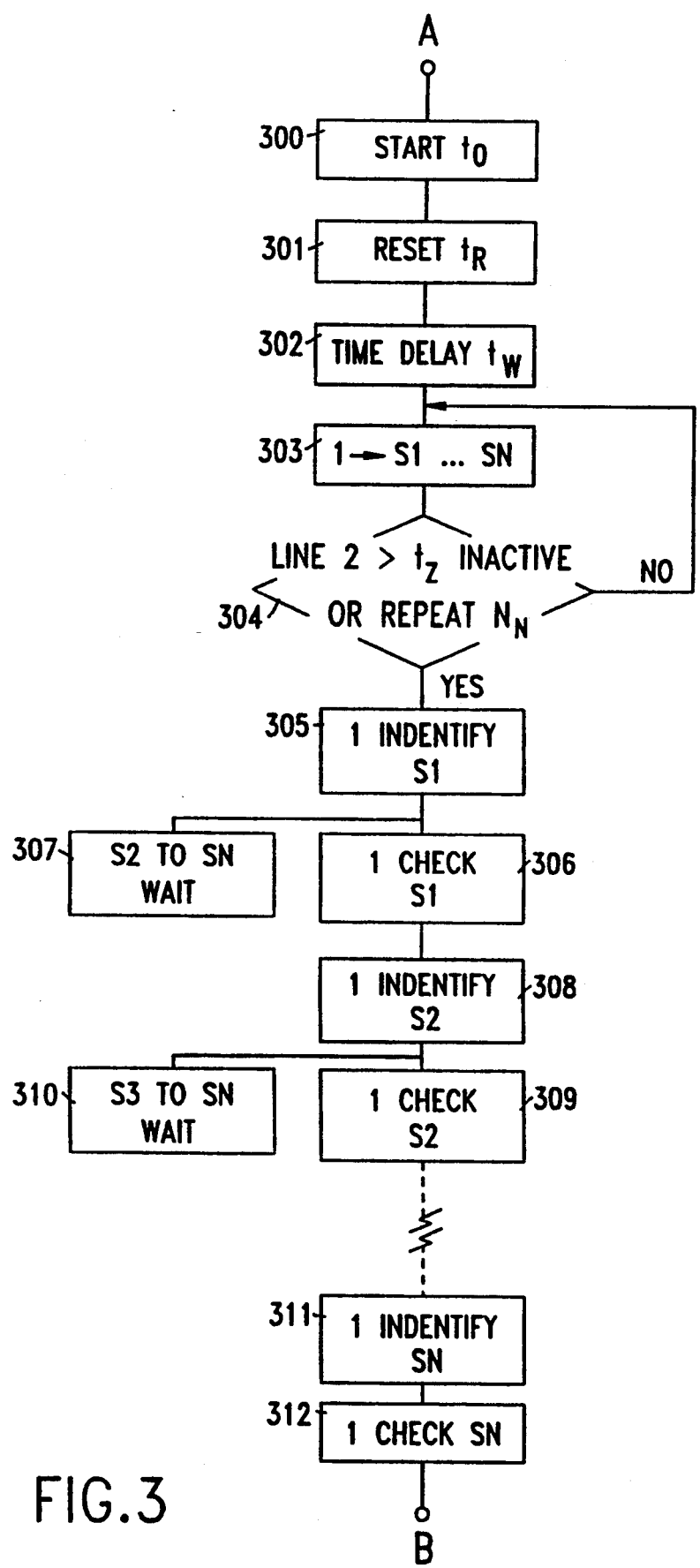
FIG. 3 is a flow chart further clarifying the start-up phases of the apparatus of FIG. 1.

The start-up process of the apparatus of the present invention is hereinafter described with reference to FIGS. 2 and 3. The apparatus is switched on at time instant $t_o$ when the motor vehicle is started. A bidirectional exchange of data then takes place between the central control unit 1 and the sensors S1, S2 . . . SN through the first line 2. The control unit 1 determines the number and the respective type of existing sensors and tests their operability by scanning. The control unit 1 then assigns a consecutive number to each sensor that is determined to be operable and, in turn, establishes a ranking sequence of the sensors S1, S2 . . . SN during the normal operating state following start-up.

The following sequence steps are performed during the start-up phase: At the start-up instant $t_o$, the central control unit 1 administers the data traffic on the first line 2, in step 300. The control unit 1 then resets the apparatus by means of a pulse having a duration $t_R$, which is long in comparison to the pulse durations occurring during normal operation, in step 301. A time delay $t_w$ follows the reset, in step 302. Immediately following the end of the time delay $t_w$, the control unit 1 transmits a pulse to control the sensors S1, S2 . . . S5 to each begin transferring a code word characteristic of the respective sensor, in step 303.

In the embodiment of the present invention illustrated, a total of five sensors S1, S2 . . . S5 (thus N=5) are assigned to the control unit 1. As a result of this command, each of the sensors S1, S2 . . . S5 outputs its code word. The control unit 1 then waits passively until one of the sensors S1, S2 . . . S5 gets through or, i.e., successfully communicates with the control unit.

One indication of a successful communication is when the first line 2 is inactive longer than a time interval $t_Z$, or when unchanged data is continuously transferred over the first line 2 at an equally spaced time interval, as shown in step 304. This data comprises a special code word which is the code word of the sensor S1. The control unit 1 thus receives the code word, identifies the sensor S1 as corresponding thereto, and assigns it a consecutive ordinal number, for example, the number 1, thus establishing a priority sequence for the sensors, in step 305. After assigning the number 1, the control unit 1 commences bidirectional communication with the sensor 1. The sensor S1 thereby "discovers" its assigned number. The control unit 1 then initiates a test cycle on the sensor S1 to obtain information about the operability of the sensor, its operational readiness, and its mounting location, in step 306. During this communication phase, the other temporarily unsuccessful sensors, S2, S3 . . . S5, wait for the phase to end, as shown in step 307.

The start-up process then continues in order to establish communications between the control unit 1 and the remaining sensors S2, S3 . . . S5. For this purpose, all sensors, except the first successful sensor S1, are controlled to repeat the phase of transmitting their code words until a second sensor successfully communicates with the control unit 1. The dialogue then takes place between the control unit 1 and the second successful sensor, as described above with respect to the sensor S1, and as shown in steps 308-310. This process is continued until all operationally ready sensors have passed the processing sequences of the start-up phase, as shown in steps 311 and 312. Then, the control unit 1 switches the apparatus into normal operation. This functional sequence is discussed in further detail below. First, however, the communications sequence during the start-up phase is hereinafter further described.

Figures 4A, 4B:
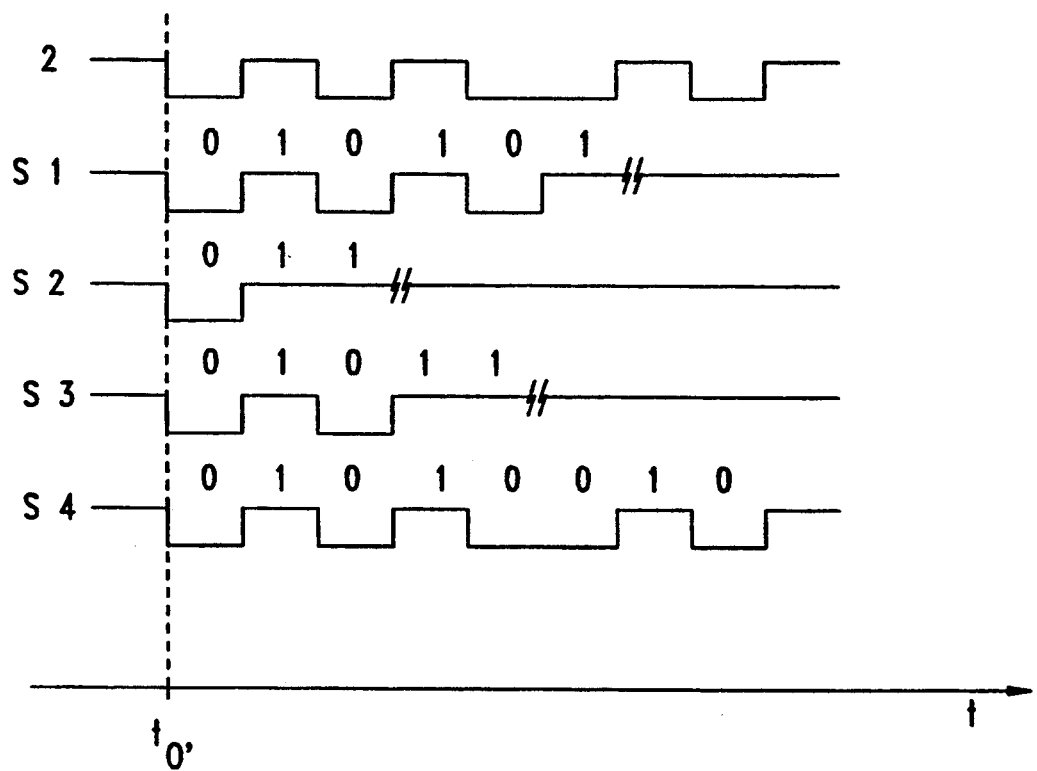
FIGS. 4a, 4b and 5 through 10 are pulse diagrams illustrating the pulses of the apparatus of FIG. 1 as a function of time to clarify various operating states of the apparatus.

In FIGS. 4a and 4b, it is assumed that the apparatus has a total of four sensors, S1, S2 . . . S4. In the communications sequence during the start-up phase, all connected sensors simultaneously transmit the code words characterizing each respective sensor in response to a command from the control unit 1. The code words are in the form of bit strings, which are shown in FIG. 4a for each of the sensors S1, S2 . . . S4.

In FIG. 4b, the pulses present on the first line 2 and the bit strings or, i.e., the code words of the sensors S1, S2 . . . S4 are illustrated. On the time axis, the time instant $t_o$ represents the end of the command pulse from the control unit 1 to cause the sensors S1, S2 . . . S4 to transmit their code words. After each bit of the respective bit string is transmitted, the status of the first line 2 is checked by each sensor S1, S2 . . . S4 to check if the output bit (which is a nominal value) matches the line status (which is the actual value). When there is no match, the respective sensor, in effect, loses the current round of communications and is not allowed to transmit any more bits of its code word. However, as long as the comparison confirms a match, the respective sensor outputs another bit of its code word until the specified number of bits of the code word, or of several code words, is processed. This process results in at least one of the sensors S1, S2 . . . S4 succeeding in each round and qualifying for the issuance of a priority sequence number from the control unit 1.

In each round only one sensor S1, S2 . . . S4 experiences a complete match of its characteristic code word with the line status and, thus, succeeds in communicating with the control unit 1. This result is achieved even when there are a large number of identical sensors, which is possible through the use of a sufficiently large number of code words and a sufficiently large random variation in code word formation.

In the example illustrated in FIGS. 4a and 4b, the sensor S4 successfully communicates with the control unit 1 and the bit string 01 01 00 10 is assigned as the code word therefor. As shown in FIG. 4b, there is a match between all of the bits of the bit string of the sensor S4 with the status of the first line 2, whereas for the remaining sensors S1, S2 and S3, only a partial match exists.

Figure 5:
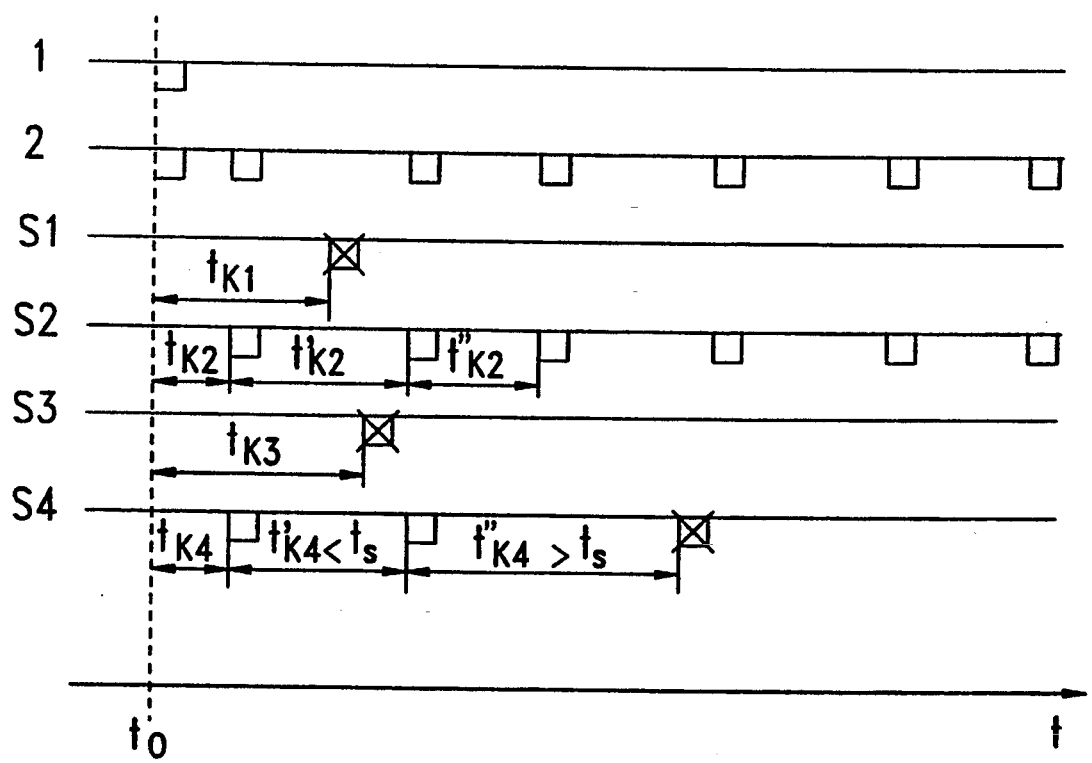

Turning to FIG. 5, a further variation of the start-up phase of the apparatus of the present invention is illustrated, wherein a distinction between the sensors S1, S2 . . . S4 is created by the use of various code words. The transmission of these code words, however, in contrast to the previously described example, does not occur simultaneously, but rather with a time lag at various instants. Upon the command by the control unit 1 to output the code words at the time instant $t_o$ each sensor S1, S2 . . . S4 initiates a time interval $t_{kx}$ (wherein x equals 1, 2, 3 and 4), which is assigned to the respective sensor, and monitors the pulse status on the first line 2. After the time interval $t_{kx}$, which is characteristic for the particular sensor, the respective sensor x emits the bit string assigned to it as a code word at that point in time; that is, until the time $t_{kx}$ passes and no other identification code referring to another sensor has been transmitted.

In FIG. 5, the characteristic time interval $t_{k1}$ is assigned to the sensor S1, which is longer than the time interval $t_{k2}$, assigned to the sensor S2, and the time interval $t_{k4}$, assigned to the sensor S4. Thus, the sensors S1 and S3 wait to transmit their code words, until their characteristic time intervals, $t_{k1}$ and $t_{k3}$, have expired. Meanwhile, the sensors S2 and S4 simultaneously transmit their code words after the expiration of their time intervals $t_{k2}$ and $t_{k4}$ which, as shown in FIG. 5, are equal. Thus, the sensors S1 and S3 do not output their code words after the expiration of their characteristic time intervals $t_{k1}$ and $t_{k3}$. As a result, sensors S1 and S3 do not complete their communications with the control unit 1 during this round of the start-up phase.

The sensors which previously transmitted their code words, S2 and S4, read back the code word received through the first line 2 and compare it with the code words that they each respectively transmitted. When the bit strings match, they each transmit a code word after the expiration of a further respective time delay, $t'_{k2}$ and $t'_{k4}$. The additional time delays $t'_{k2}$ and $t'_{k4}$ are each shorter than a threshold time value $t_S$. As previously described, during each respective time delay, $t'_{k2}$ and $t'_{k4}$ the first line 2 is monitored by the sensors S1, S2 . . . S4 for a strange identification code. If a strange identification code is detected by a sensor, the output of its own code word is prevented and, thus, its attempt to communicate during the current round is unsuccessful.

In the example illustrated in FIG. 5, the time delays $t'_{k2}$ and $t'_{k4}$ are equal, but their transmitted code words are different. By ORing (the first line 2 is a wired, low active OR gate), the code word of the sensor S2 is not changed, whereas the code word output by the sensor S4 is changed. During the immediately following read-back of the code word from the first line 2, the sensor S4 recognizes a difference from its transmitted code word. However, the code word of sensor S2 remains unchanged. After the sensor S4 detects a difference between the transmitted and readback code word, the same code word is transmitted after a further time delay $t''_{k4}$. The time delay $t''_{k4}$ is greater than the threshold time value $t_S$.

In contrast to the response of sensor S4, the sensor S2 transmits its next code word after a time delay $t''_{k2}$. The period of the delay $t''_{k2}$ is shorter than the threshold time value $t_S$. As a result, the additional code word of the sensor S2 is the first one present on the first line 2 and, thus, the sensor S4 aborts its attempt to communicate with the control unit 1. During this sequence, the sensor S2 outputs all of the code words assigned to it. This permits the control unit 1 to recognize sensor S2 as the sensor that was successful in completing the communication. The control unit 1 responds to the sensor S2 by commencing the previously described bidirectional communication process.

A variation of the code words is achieved in a practical manner through use of the following parameters: fixed specified parameters, such as the type of each respective sensor used; the serial number of each respective sensor; and the electronic unit or a feature which characterizes the respective state of development of the apparatus. In addition, variable or random parameters can be employed for yet greater variation. Variable parameters may be, for example, the contents of specified memory cells of the storage means 5 immediately after starting the apparatus; random input signals, such as the supply voltage of the apparatus which is converted by an analog to digital converter; or random internal signals, such as the analog signal of a sensor (S2, S3 . . . SN) converted into a digital value.

The following description assumes that the start-up phase is over and that the control unit 1 has assigned ordinal numbers determining the ranking sequence for the sensors coupled thereto. It is also assumed that the apparatus comprises a total of five sensors (S1, S2 . . . S5). During normal operation, two different operating modes of the apparatus of the present invention are possible. In one operating mode there is synchronization of the sequence steps of the control unit 1, and in the other operating mode there is no such synchronization.

The operating mode with synchronization by the control unit 1, is hereinafter described with reference to the pulse diagram of FIG. 6. The control unit 1 specifies a fixed time mark at the time instant $t_{0'}$ at which point each sensor S1, S2 . . . S5 initiates a time delay $t_{WX}$. Each sensor has its own characteristic time delay until the transmission of its data. The time mark can consist of one, or possibly several, signal edges and/or data strings. If the time mark consists of one or several data words, additional control information can be transferred from the control unit 1 to the sensors S1, S2 . . . S5.

Figure 6:
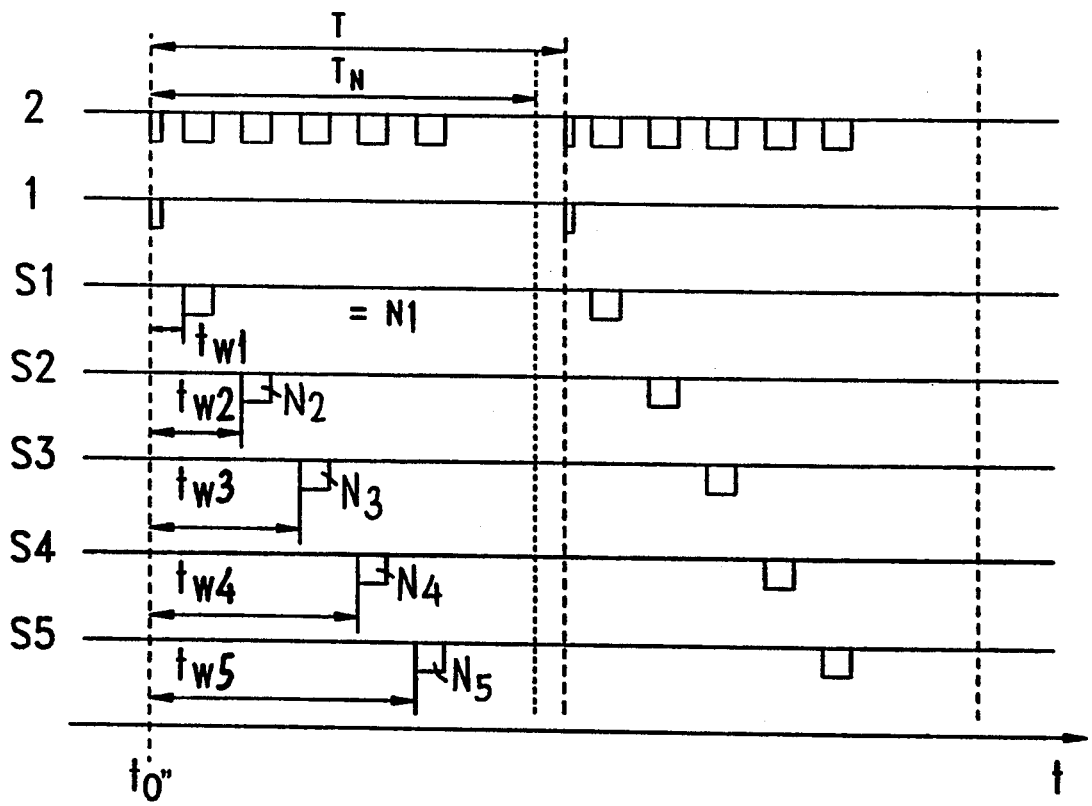

As illustrated in FIG. 6, the sensors S1, S2 . . . S5 commence their time delays $t_{WX}$ following the time mark, which is output by the control unit 1. After each respective time delay $t_{W1}$, $t_{W2}$ . . . $t_{W5}$ has passed, each respective sensor S1, S2 . . . S5 transmits its message N1, N2 . . . N5 to the control unit 1. After its transmission, each sensor S1, S2 . . . S5 awaits the end of the time interval $T_N$ in order to recognize the next time mark of the control unit 1, which appears at the end of the time interval T.

Figure 7:
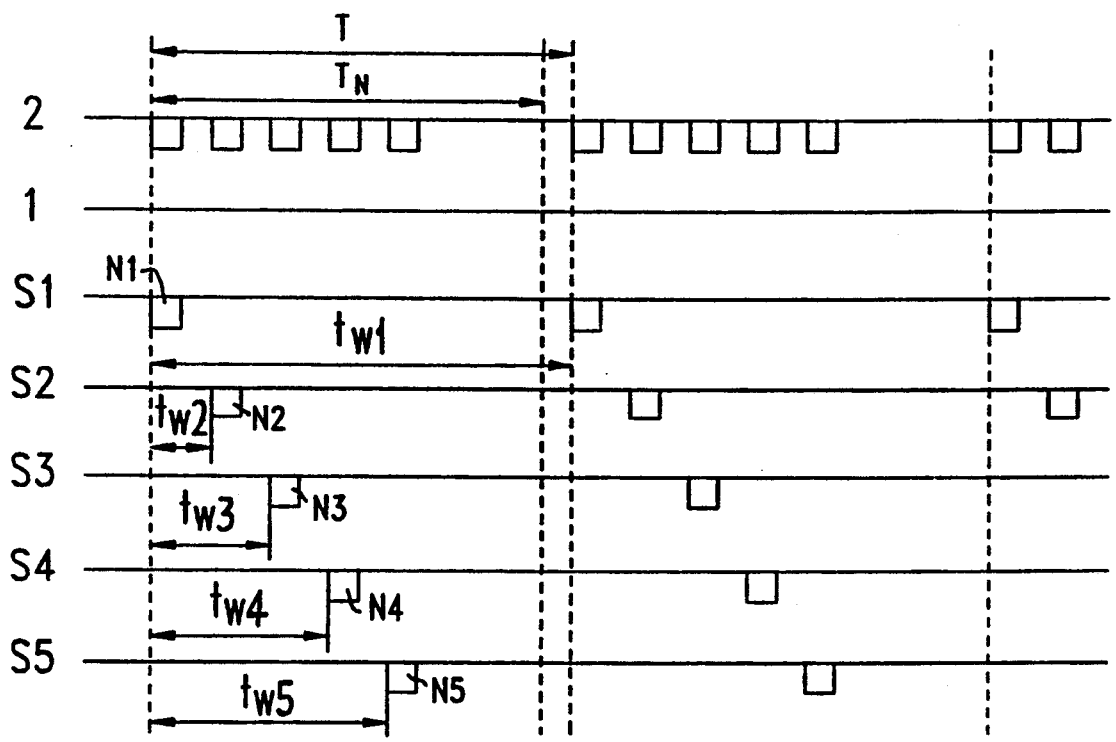
Figure 8:
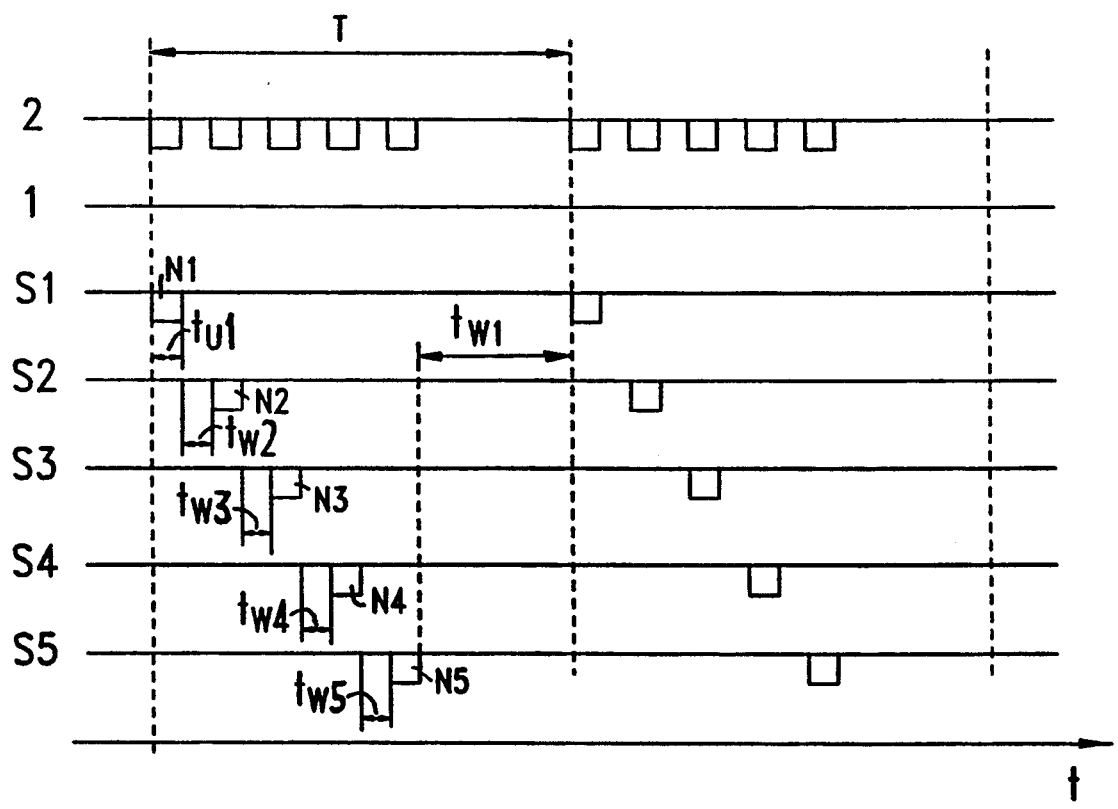

An operating mode of the apparatus of the present invention without synchronization by the control unit 1 is hereinafter described with reference to the pulse diagrams of FIGS. 7 and 8. In this example, five sensors S1, S2 . . . S5 are used, and the communication between the sensors and the control unit 1 is unidirectional. Thus, data is only transmitted in the direction of the sensors S1, S2 . . . S5 to the control unit 1.

A sensor of the apparatus, which functions as a master, is specified. The master sensor is preferably the first sensor in the chronological sequence. Thus, the master sensor received the highest priority during the start-up phase and was assigned the ordinal number 1 from the control unit 1. The master sensor S1 transmits its message N1 to the control unit 1 at the point in time $t_{W1} = T$, as shown in FIG. 7. Upon the appearance of the message N1 on the first line 2, the other sensors S2, S3 . . . S5 begin their time delays $t_{W2}$, $t_{w3}$ . . . $t_{W5}$. When the respective time delays $t_{W2}$, $t_{w3}$ . . . $t_{W5}$ pass, each respective sensor transmits its respective message N2, N3 . . . N5. Following each respective transmission, each sensor S2, S3 . . . S5 waits until the time $T_N$ has passed to receive the message N1 of the sensor S1 which serves as the time mark.

The following conditions are valid for both operating modes of the apparatus of the present invention, that is, with or without synchronization by the control unit 1. The time interval $t_{WX}$ must be greater than the time interval ($t_{W(x-1)}$ + transmission time $(x-1)$), as shown in FIG. 7. The time delay $t_{WX}$ can be fixed or can be specified by the control unit 1 during the start-up phase. All messages N1, N2 . . . N5 must be transmitted by the end of time interval $T_N$. The unutilizable time, i.e., the difference between T and $T_N$, facilitates the reliable recognition of the time mark output by the control unit 1. The messages N1, N2 . . . N5 have varying lengths and formats in comparison to each other. For example, there can be differences in the duration of the time window which is available for transmitting a message; differences in the number of data words between messages; differences in the format of the data words of messages; and differences in other criteria, such as the start/stop bits, parity bits, and baud rates.

In the operating mode without synchronization by the control unit 1, the sensors S1, S2 . . . SN orient themselves relative to the foremost or master sensor in the chronological ranking sequence. In the example illustrated, the sensor S1 is assumed to be the master sensor. The sensors not transmitting monitor the first line 2 and, in turn, recognize the state and the respective transmitting sensor.

The operating mode of the apparatus without synchronization by the control unit 1 is hereinafter described with reference to the pulse diagram of FIG. 8. The sensor 1, which is the master sensor, transmits its message N1 to the control unit 1 within the transmission time $t_{U1}$. After a time delay $t_{W2}$, the sensor S2 transmits its message N2, which follows the end of the transmission of the message N1 by the sensor S1. Then, the sensors S3, S4 and S5 each transmit after their respective time delays $t_{W3}$, $t_{W4}$ and $t_{W5}$ have passed. In this example, it holds that $$t_{U1} = t_{U2} = \ldots = t_{UN}$$

$$t_{W2} = \ldots t_{WN}$$

$t_{W1}$ is the supplement to the full refresh time T or, that is, the difference between the end of the transmission time of the sensor S5 and the end of the time interval T. Thus, even in the case of a varying number of sensors, the same time T is achieved.

One advantage of the present invention is its flexibility in responding to various malfunctions. As described above, all operable sensors S1, S2 . . . SN report during the start-up phase and, after the reset, establish communication with the control unit 1.

In the following example, it is assumed that one of the sensors S1, S2 . . . SN is inoperable and does not report in the manner described, and is explained with reference to FIG. 2. Since the control unit 1 determines the total number of sensors S1, S2 . . . SN which are present in the apparatus, it generates a repeated signal request to prompt each faulty sensor to output its code word. Only upon receiving no response to the repeated signal request is the faulty sensor, e.g., the sensor S3, registered as defective. A corresponding error display can be transmitted to the driver of the vehicle. Then, the transition into normal operation with the remaining operable sensors takes place.

It is assumed for the following description that during the start-up phase, all of the sensors of the apparatus are recognized as operable. Then, following the start-up phase, at least one sensor fails. In this case, there is a distinction between the operating modes with or without synchronization by the control unit 1. With the synchronization mode, a malfunction of one or several sensors S1, S2 . . . SN causes a change in the pulse diagram of FIG. 6. The corresponding time window, which was provided to report the defective sensor simply remains empty.

The reintegration of a sensor which becomes operable after having been defective, is achieved by resuming the transmission of data by the particular sensor. During a malfunction, such as an interruption of the power supply, a sensor may forget or lose its ordinal number assigned by the control unit 1, which determines the priority sequence of the sensors. In this case, a bidirectional communication occurs within the empty time window, between the sensor which subsequently becomes operable and the control unit 1. If several sensors S1, S2 . . . SN malfunction in this manner, the control unit 1 commences a modified form of communication in the empty time window. The differentiation of the sensors S1, S2 . . . SN occurs through use of different code words, and a time shift is implemented by means of periodic dislocation.

Figure 9:
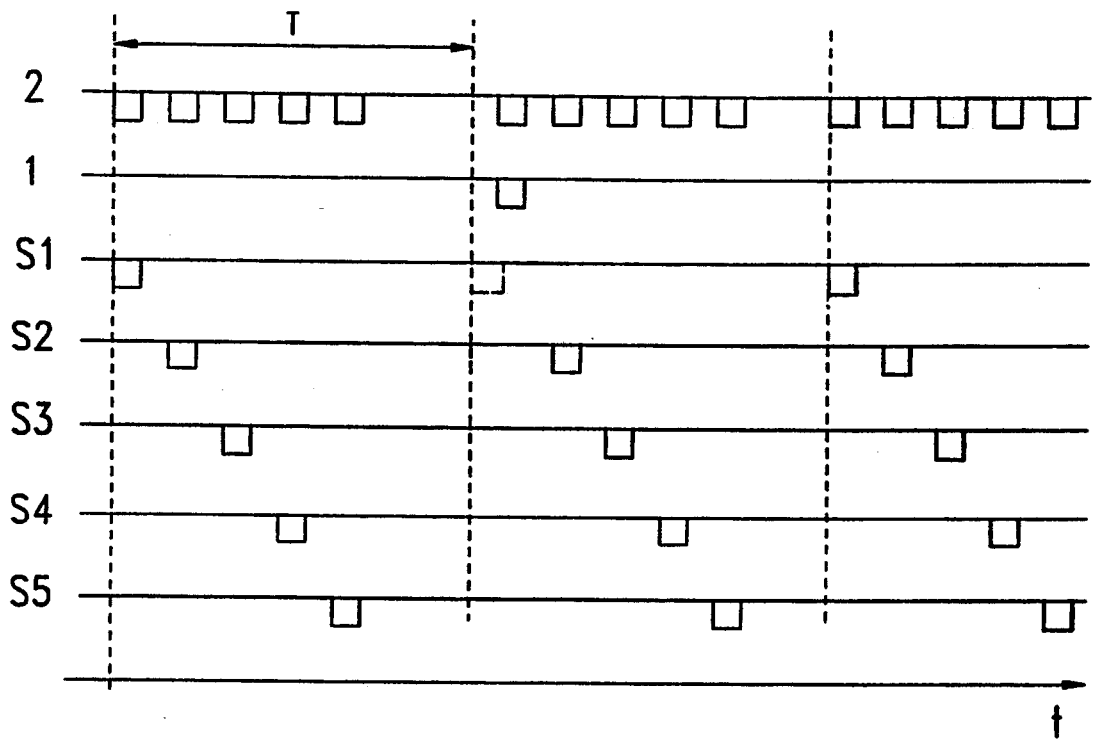

When the apparatus of the present invention orients the sensors S1, S2 . . . SN relative to a master sensor, a procedure similar to that described above is used when one or several of the sensors S2, S3 . . . SN malfunctions. However, if the sensor S1, which received the highest priority from the control unit 1 during the start-up phase and which functions as the master sensor, malfunctions, a different approach must be taken. In this case, the control unit 1 outputs the time mark for orienting the remaining sensors S2, S3 . . . SN, as illustrated in the diagram of FIG. 9.

Another operating mode of the apparatus of the present invention is without synchronization and without the use of a sensor as a master sensor. In this mode, the sensors S1, S2 . . . SN monitor the first line 2 and thus immediately recognize the malfunction of any one sensor S1, S2 . . . SN. To compensate for the empty time window caused by a malfunctioning sensor, the subsequent time delays are lengthened accordingly. This is illustrated by the example shown in the pulse diagram of FIG. 10.

Figure 10:
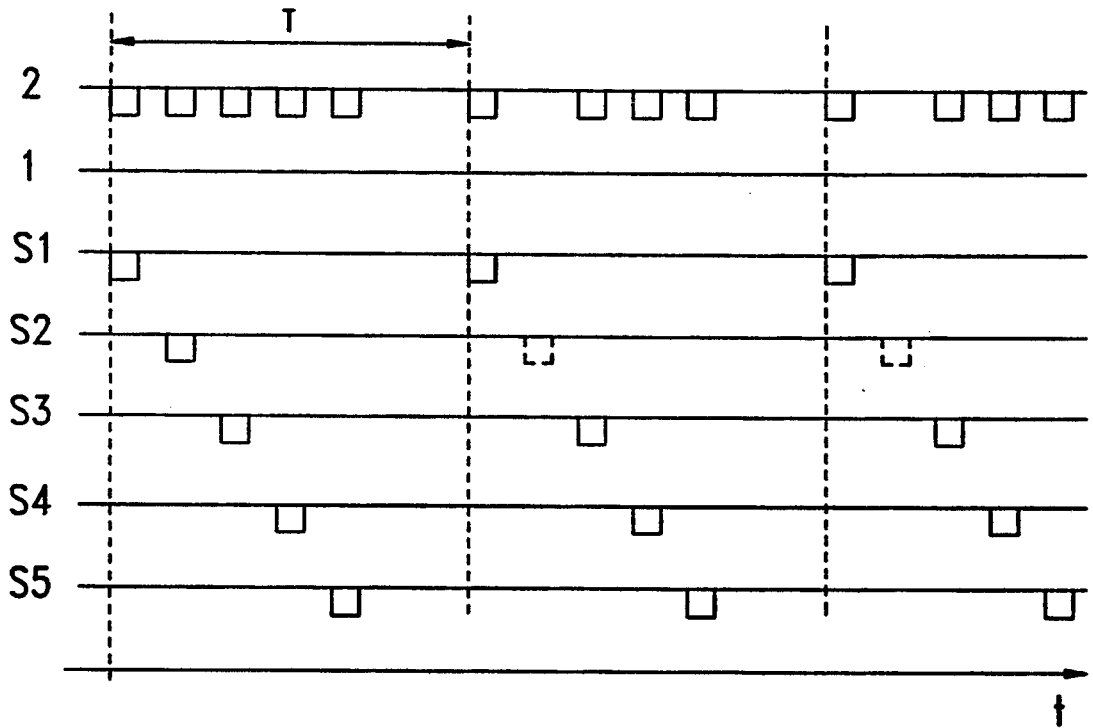

In describing the following example with reference to FIG. 10, it is assumed that the sensor S2 is malfunctioning. The sensor S3 recognizes this condition and correspondingly lengthens its time delay $t_{W3}$ by the transmission time $t_{U2}$ (which equals $t_U$). After the time delay $t_{W3}$ passes, the sensor S3 outputs its message. If the sensor S2 is no longer malfunctioning, it can be integrated back into the process in the empty time window, in the same way as described above in the previous example.

So far, it has been assumed that an initially malfunctioning sensor S1, S2 . . . SN later becomes operable. Then, if the sensor is no longer malfunctioning, it can be integrated back into the normal operating sequence of the apparatus. However, if one of the sensors S1, S2 . . . SN remains permanently inoperable, the flexibility of the apparatus permits a purposeful alteration of the operating mode. For example, the control unit 1 can evaluate the output signals of the remaining operable sensors using a weighting factor in order to compensate for the defective sensor.

As an alternative, the tripping processes of the inertial restraining devices R1, R2 . . . RN can be altered as a function of the signals of the sensors S1, S2 . . . SN. For example, if an inertial restraining device is normally activated when an output signal is received from two sensors, thus indicating a head-on collision, the control unit 1 can decide that the inertial restraining devices R1, R2 . . . RN should be released when only the output signal of one sensor is generated.

For reasons of economy, it is preferable to use identical sensors for all sensors S1, S2 . . . SN. Thus, in order to derive the optimum safety criteria therefrom, the output signal of each sensor is weighted differently according to the mounting location of the respective sensor on the vehicle. Weighting can also be used to effect different activation processes of the inertial restraining devices R1, R2 . . . RN. For example, in the case of a rear-end collision, it is not practical to activate the airbag, since the passengers are not forced in the travelling direction of the vehicle. Thus, during a rear-end collision, it is only necessary to activate the belt tightening inertial restraining devices R1, R2 . . . RN. Thus, if the control unit 1 receives data from the sensors S1, S2 . . . SN indicating a rear-end collision, the activation process of the inertial restraining devices R1, R2 . . . RN is correspondingly adjusted.

As described above, the storage means 5 of the control unit 1 stores data indicative of the type and mounting locations of the sensors S1, S2 . . . SN. In particular, when using identical sensors S1, S2 . . . SN which are positioned in different mounting locations on the vehicle, it is preferable that the sensors transmit data to the control unit 1 indicative of their respective mounting positions. The sensors S1, S2 . . . SN also each transmit a specific code word. This permits the control unit 1 to identify the respective sensor S1, S2 . . . SN during the further operating sequences of the apparatus.

The evaluating units A1, A2 . . . AN, which are coupled to the corresponding sensors S1, S2 . . . SN, also serve in a particularly advantageous manner to process the output signals of the sensors S1, S2 . . . SN. It is possible to transmit to the control unit 1 not only the actual output signal of a respective sensor S1, S2 . . . SN, which is dependent on the acceleration of the vehicle, but also to transmit the peak values of the acceleration signals, the mean value of the output signals of a respective sensor S1, S2 . . . SN, and/or an integration value of these signals. The apparatus of the present invention also permits checking of the sensor supply voltage. It also provides error data for recognizing a gradual drop in the output of a particular sensor S1, S2 . . . SN or a suddenly occurring inoperability thereof. This data is transmitted to the control unit 1 which, in turn, recognizes the problem.

Another advantage of the present invention is that a safety switch, which was typically required in conventional safety devices, is unnecessary. This advantage is achieved because the activation of an inertial restraining device R1, R2 . . . RN is only possible through successful communication between the sensors S1, S2 . . . S3 and the control unit 1 and, furthermore, between the respective inertial restraining device R1, R2 . . . RN and the control unit 1.

The first and second lines 2 and 3 are preferably single core data transmission lines. One advantage of this construction is that it reduces the complexity involved in installating the cable system and required cable intersections. Moreover, while making installation easier, this construction also increases the reliability of the apparatus. Fiber optic guides can also be used in a particularly advantageous manner as the first and second lines 2 and 3. In such a case, the interfaces I1, I2 . . . IN and IR1, IR2 . . . IRN serve simultaneously to convert electronic signals into optical signals and vice versa, depending on the direction of transmission thereof.

Another advantage of the apparatus of the present invention is that it is possible to install the control unit 1 in a random, specially suited mounting location in the vehicle. The sensors S1, S2 . . . SN can also be mounted in mounting locations which are most suitable for this purpose. For example, at least one sensor S10' can be mounted within the control unit 1 or in its immediate proximity. In this way, acceleration changes can be detected which indicate the occurrence of a vehicle collision, or potential collision situation. The inertial restraining devices R1, R2 . . . RN can in turn be activated in response to the sensor signals generated indicative thereof. This permits the activation of the inertial restraining devices R1, R2 . . . RN even when the first line 2, which connects the sensors S1, S2 . . . SN to the control unit 1, is interrupted or disabled due to a malfunction caused, for example, by a vehicle collision.

We claim:

1. A device for controlling motor vehicle safety devices comprising:
   a plurality of sensors mounted on the motor vehicle and adapted to transmit output signals indicative of an acceleration of the motor vehicle;
   a control unit coupled to the sensors and to the safety devices, the control unit evaluating the signals transmitted by at least one of the sensors and controlling actuation of the safety devices as a function of the evaluated signals;
   a serial data transmission line coupling each of the sensors to each of the other sensors and to the control unit;
   the serial data transmission line providing bidirectional communication of signals among the sensors, and between each of the sensors and the control unit;
   each of the sensors receiving all of the signals transmitted over the serial data transmission line by each of the other sensors and by the control unit;
   each of the sensors processing the signals received from each of the other sensors;
   each of the sensors processing the signals received from the control unit; and
   each of the sensors determining when to transmit a respective signal over the serial data transmission line as a function of the signals received and processed from each of the other sensors and of the signals received and processed from the control unit.

2. The device according to claim 1, wherein at least one sensor is mounted within the control unit or in its immediate proximity.

3. A device as defined in claim 1, further comprising:
   a plurality of evaluation circuits, each evaluation circuit being coupled between a respective sensor and the serial data transmission line and adapted to convert the output signal of the respective sensor into a signal sequence for transmission over the data transmission line.

4. A device as defined in claim 3, further comprising:
   a plurality of interface circuits, each interface circuit being coupled between a respective evaluation circuit and the data transmission line and adapted to convert analog signals generated by the respective sensor into digital signals for transmission over the data transmission line.

5. A device as defined in claim 4, wherein
   the data transmission line is an optical fiber line, and each interface circuit is adapted to convert the electronic signals generated by the respective sensor into optical signals for transmission over the data transmission line and, in turn, to convert the optical signals transmitted by the control unit to the respective sensor over the data transmission line into electronic signals.

6. A device as defined in claim 3, wherein each evaluation circuit is adapted to transmit signals to the control unit indicative of the type of the respective sensor and its mounting location on the motor vehicle.

7. A device as defined in claim 6, further comprising means for storing the signals generated by the evaluation circuits indicative of the type of each respective sensor and its mounting location on the motor vehicle.

8. The device according to claim 7, wherein the control unit, in order to identify each respective sensor, compares the data indicative of the type and mounting location of each respective sensor stored in the means for storing and transmitted by the evaluation circuits.

9. A device as defined in claim 1, wherein the control unit detects an inoperable sensor, whereupon the detection of an inoperable sensor, the control unit is adapted to apply a weighted factor to the output signal transmitted by each operable sensor to compensate for the inoperable sensor.

10. A method for controlling motor vehicle safety devices as a function of output signals indicative of an acceleration of the motor vehicle transmitted by a plurality of sensors mounted on the motor vehicle, wherein each of the sensors is coupled to each of the other sensors and to a control unit through a serial data transmission line providing bidirectional communication of signals among the sensors, and between each of the sensors and the control unit, and wherein the control unit controls actuation of the safety devices as a function of the signals transmitted by the sensors, the method comprising the following steps:

detecting the number of operable sensors and the type of each operable sensor through the serial data transmission line;

assigning an ordinal number to each operable sensor, thus forming a ranking sequence for the sensors, wherein the ranking sequence determines the order in which the control unit communicates with each of the sensors through the serial data transmission line;

transmitting all of the signals from each of the sensors and from the control unit over the serial data transmission line;

receiving, in each of the sensors, all of the signals transmitted from each of the other sensors;

receiving, in each of the sensors, all of the signals transmitted from the control unit;

processing, in each of the sensors, the signals transmitted from each of the other sensors;

processing, in each of the sensors, the signals transmitted from the control unit; and determining when to transmit a respective signal from each of the sensors over the serial data transmission line as a function of the signals received and processed from each of the other sensors and of the signals received and processed from the control unit.

11. A method as defined in claim 10, further comprising the step of, prior to forming a ranking sequence, transmitting a reset pulse from the control unit over the data transmission line, the reset pulse having a duration longer than the pulses transmitted during normal operation, and wherein the assigning step includes the step of transmitting a characteristic code word for each operable sensor to the control unit over the data transmission line.

12. A method as defined in claim 11, wherein the assigning step further includes the following steps:

upon transmission of the complete coded word for a first operable sensor to the control unit, assigning to the first operable sensor an ordinal number characteristic of the highest priority level, and then commencing bidirectional communication between the first operable sensor and the control unit.

13. A method as defined in claim 12, wherein the assigning step further includes the following steps:

upon completing the bidirectional exchange of data between the first operable sensor and the control unit, successively identifying each additional operable sensor and performing bidirectional communication between each additional operable sensor and the control unit until each operable sensor is assigned an ordinal number, thus forming the ranking sequence.

14. A method as defined in claim 10, wherein the assigning step includes the following steps:

transmitting a command signal by the control unit onto the data transmission line;

transmitting a code word in the form of a bit string for each operable sensor onto the data transmission line in response to the command signal;

comparing each bit transmitted for each operable sensor to the status of the data transmission line, and if the bit transmitted by an operable sensor does not match the status of the data transmission line, ceasing the transmission of the code word for the operable sensor until the control unit transmits another control signal.

15. A method as defined in claim 14, wherein the assigning step further includes the following steps:

upon the transmission of the command signal by the control unit, measuring a characteristic time delay for each sensor, and upon expiration of the characteristic time delay for each sensor, determining whether the code word for another sensor is present on the data transmission line, and if the code word for another sensor is not present on the data transmission line, transmitting the code word for the sensor on the data transmission line.

16. A method as defined in claim 12, wherein the assigning step further includes the following steps:

transmitting a command signal from the control unit onto the data transmission line;

defining the operable sensor with the ordinal number characteristic of the highest priority level as a master operable sensor, and transmitting a code word in the form of a bit string onto the data transmission line for the master sensor after a first time delay following the command signal; and upon completion of the transmission of the code word for the master sensor, successively transmitting the code words for each other operable sensor upon the expiration of a characteristic time delay for each operable sensor following the command signal, wherein each characteristic time delay is selected so that the transmission of a code word is initiated after the transmission of a preceding code word is completed.

17. A method as defined in claim 14, wherein the assigning step further includes the following steps:

upon completing the transmission of a complete code word for a sensor, reading the complete code word transmitted over the data transmission line and comparing the complete code word with the code word intended to be transmitted over the data transmission line, and upon the expiration of a time delay, if the complete code word is the same as the code word intended to be transmitted, and if the code word for another sensor is not present on the data transmission line, transmitting the code word for another sensor.

18. A method as defined in claim 10, wherein the assigning step includes the following steps:
- transmitting a plurality of command signals from the control unit onto the data transmission line, wherein each command signal is directed to a respective operable sensor and designates a different point in time for the respective operable sensor;
- transmitting a code word in the form of a bit string for each operable sensor onto the data transmission line, each code word being transmitted at a separate point in time with respect to the other code words based on the command signal for the respective operable sensor; and
- comparing each bit transmitted for each operable sensor to the status of the data transmission line, and if the bit transmitted by a sensor does not match the status of the data transmission line, ceasing the transmission of the code word for the sensor until the control unit transmits another command signal.

19. A method as defined in claim 10, further comprising, after the assigning step, a step selected from the group including:

a) determining the mean value of the acceleration signals generated by each operable sensor over a predetermined period of time, and controlling the release of the safety devices based thereon;

b) integrating the acceleration signals generated by each operable sensor and controlling the release of the safety devices based thereon; and c) determining the maximum value of the acceleration signals generated by each operable sensor over a predetermined period of time, and controlling the release of the safety devices based thereon.

20. A method as defined in claim 10, wherein the assigning step includes the step of transmitting to the control unit data selected from the group including: data indicative of the supply voltage for each operable sensor; and data indicative of the mounting location of each operable sensor.

21. A method as defined in claim 10, further comprising the step of upon detecting an inoperable sensor, applying a weighted factor to the output signal transmitted by each operable sensor to compensate for the inoperable sensor.

22. A method as defined in claim 10, further comprising, after the assigning step, the step of converting the signals generated by the sensors into digital signals for transmission as bit strings over the data transmission line.

* * * * *